(12) United States Patent
Numako

(10) Patent No.: US 9,621,815 B2
(45) Date of Patent: Apr. 11, 2017

(54) PHOTOGRAPHING APPARATUS AND PHOTOGRAPHING CONTROL METHOD

(71) Applicant: RICOH IMAGING COMPANY, LTD., Tokyo (JP)

(72) Inventor: Norio Numako, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 0 days.

(21) Appl. No.: 15/031,906

(22) PCT Filed: Sep. 19, 2014

(86) PCT No.: PCT/JP2014/074878
§ 371 (c)(1),
(2) Date: Apr. 25, 2016

(87) PCT Pub. No.: WO2015/064243
PCT Pub. Date: May 7, 2015

(65) Prior Publication Data
US 2016/0269606 A1   Sep. 15, 2016

(30) Foreign Application Priority Data

Oct. 29, 2013   (JP) ................................ 2013-223899

(51) Int. Cl.
*H04N 5/232*     (2006.01)
*H04N 5/235*     (2006.01)
(Continued)

(52) U.S. Cl.
CPC ............. *H04N 5/2353* (2013.01); *G03B 5/00* (2013.01); *H04N 5/2173* (2013.01);
(Continued)

(58) Field of Classification Search
None
See application file for complete search history.

(56) References Cited

U.S. PATENT DOCUMENTS 6,587,148 B1   7/2003   Takeda et al.
7,853,135 B2   12/2010  Uenaka
(Continued)

FOREIGN PATENT DOCUMENTS

JP   H08-114769 A   5/1996
JP   09-116910 A    5/1997
(Continued)

OTHER PUBLICATIONS

U.S. Appl. No. 15/031,875 to Norio Numako, which was filed on Apr. 25, 2016.
(Continued)

*Primary Examiner* — James Hannett
(74) *Attorney, Agent, or Firm* — Greenblum & Bernstein, P.L.C.

(57) ABSTRACT

A photographing apparatus and a photographing control method are provided, including an exposure-commencement instructing device configured to provide an instruction to commence an exposure of the image sensor, and an exposure-commencement controller configured to commence a driving of the movable member via the driver upon the image sensor being instructed to commence an exposure by the exposure-commencement instructing device in a non driving state of the movable member, performed by the driver, and after a predetermined unstable-operation period of time of the low-pass filter operation lapses from the commencement of the driving of the movable member, the exposure-commencement controller commences an exposure of the image sensor.

16 Claims, 7 Drawing Sheets

(51) Int. Cl.
*G03B 5/00* (2006.01)
*H04N 5/225* (2006.01)
*H04N 5/217* (2011.01)
*G03B 19/12* (2006.01)

(52) U.S. Cl.
CPC ........... *H04N 5/2253* (2013.01); *H04N 5/235* (2013.01); *H04N 5/23287* (2013.01); *G03B 19/12* (2013.01); *G03B 2205/0038* (2013.01)

(56) References Cited

U.S. PATENT DOCUMENTS

2003/0214599 A1* 11/2003 Ito .............................. B08B 7/02
348/335

2008/0079812 A1* 4/2008 Yamamoto ........... H04N 5/2254
348/207.99

FOREIGN PATENT DOCUMENTS

| JP | 2006-101452 A | 4/2006 |
| JP | 2006-323237 A | 11/2006 |
| JP | 2008-020691 A | 1/2008 |
| JP | 2008-035241 A | 2/2008 |
| JP | 2008-148178 A | 6/2008 |
| JP | 2008-193195 A | 8/2008 |
| JP | 2011-232650 A | 11/2011 |
| JP | 2014-225818 A | 12/2014 |

OTHER PUBLICATIONS

Search Report issued by WIPO in Patent Application No. PCT/JP2014/074878, dated Dec. 9, 2014.

* cited by examiner

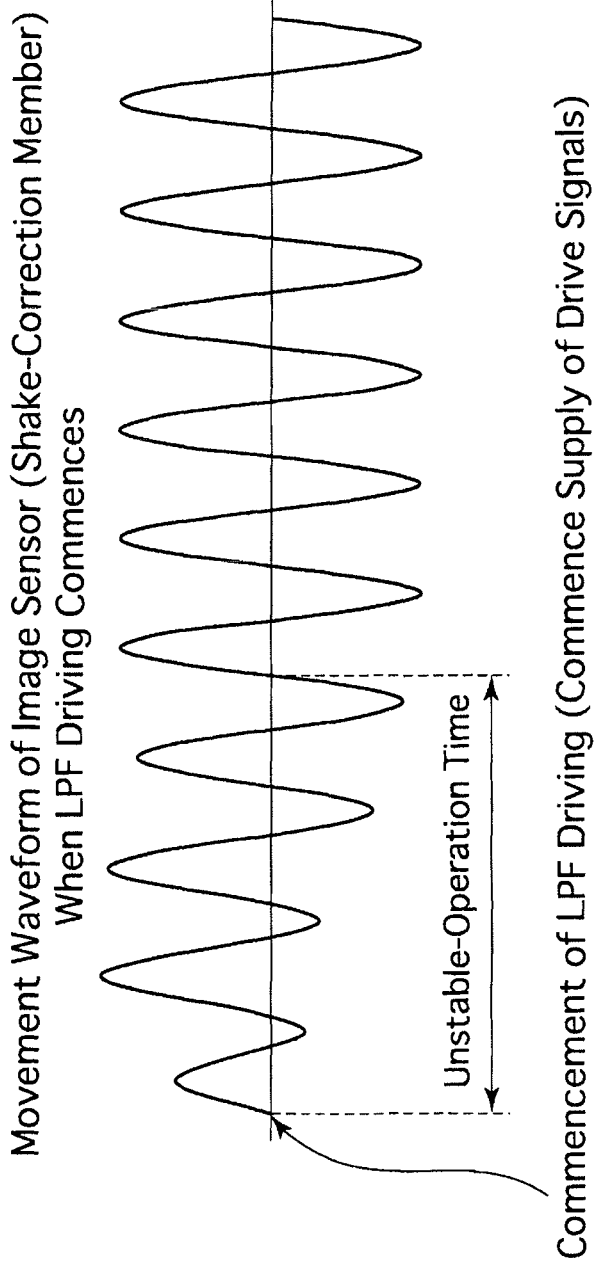

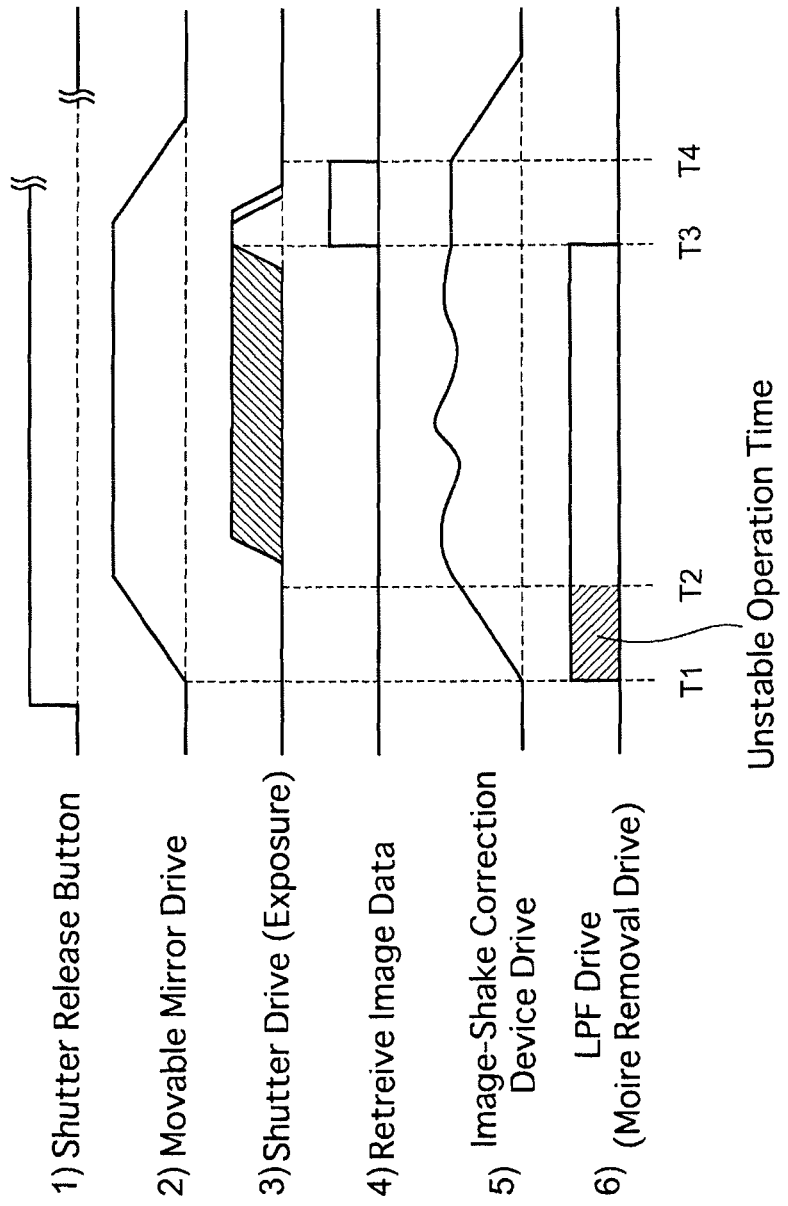

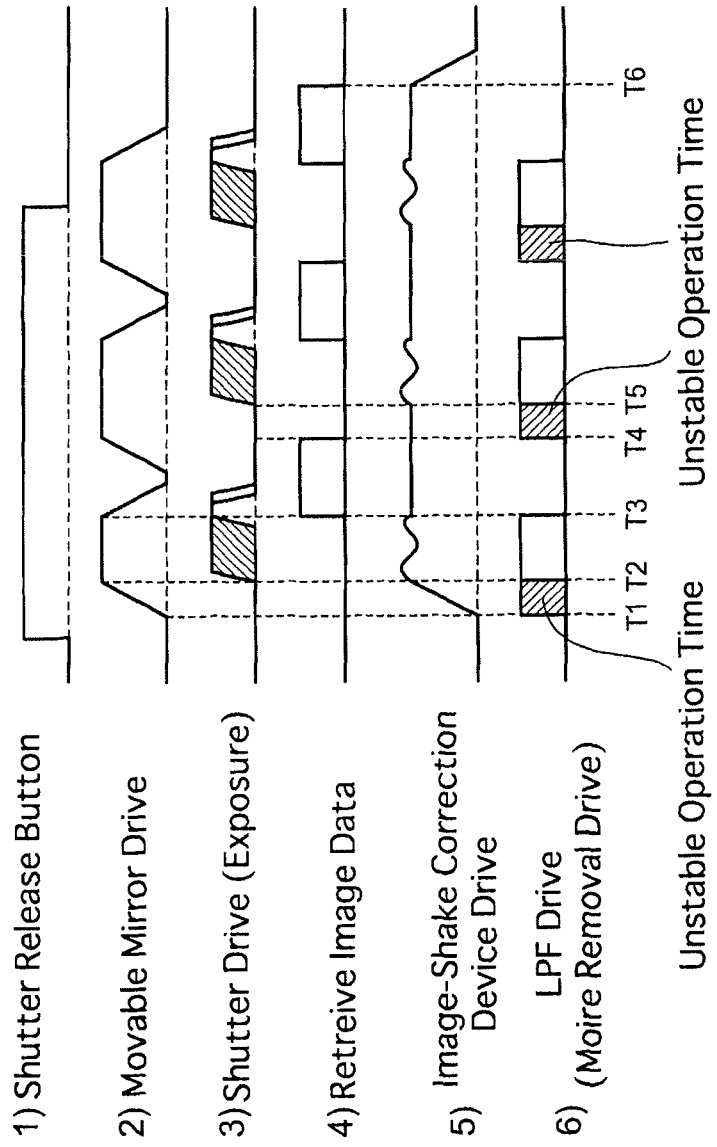

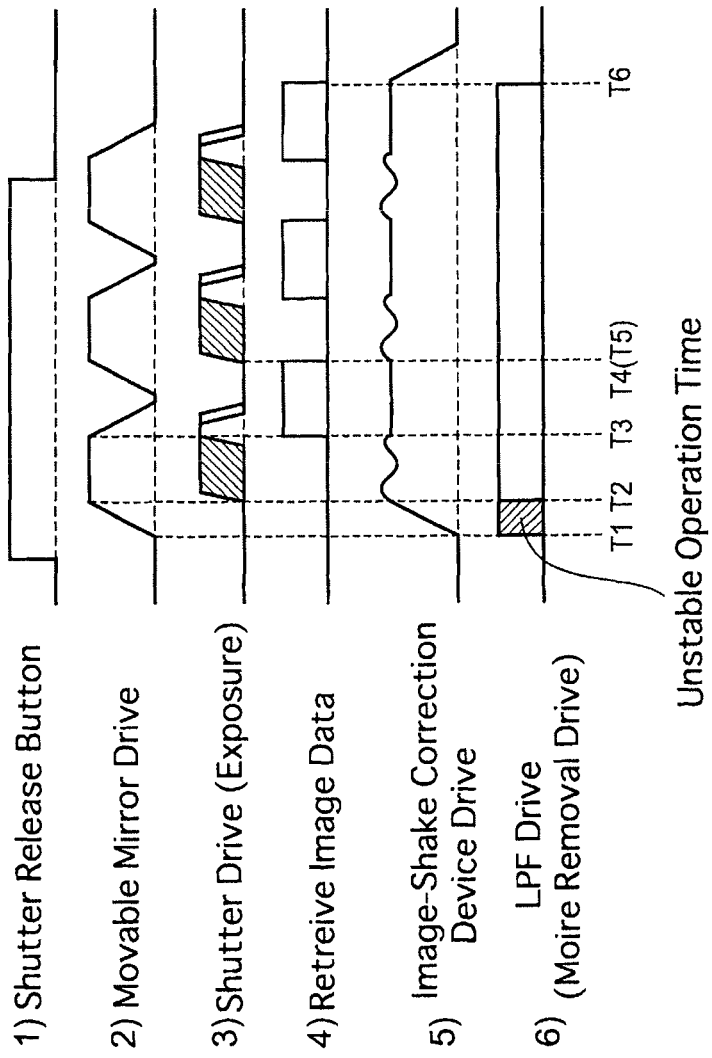

PHOTOGRAPHING APPARATUS AND PHOTOGRAPHING CONTROL METHOD

TECHNICAL FIELD

The present invention relates to a photographing apparatus, having an LPF function, and a photographing control method which are capable of obtaining an optical low-pass filter effect by driving a movable member (shake-correction member) in an direction different (e.g., within a plane that is orthogonal to the optical axis) to that of an optical axis of a photographing optical system.

BACKGROUND ART

When using a digital camera to photograph an object that has periodicity, sometimes moire or false color that did not originally exist occurs due to periodic distortion between the object period and the pixel pitch. Conventionally, the occurrence of moire and false color was prevented by inserting an optical low-pass filter into the optical path of the photographing optical system to separate the photographing light rays into normal light rays and abnormal light rays (separated into 2 points or 4 points). However, since optical low-pass filters are expensive, and cause the resolving power and contrast to deteriorate, in recent years the number of digital cameras that do not use optical low-pass filters has been increasing.

Patent Literature 1 discloses a digital camera for preventing occurrence of moire and false color without using an optical low-pass filter. This digital camera is provided with an LPF function that obtains an optical low-pass filter effect by driving an image sensor, during an exposure, by approximately one pixel and in a predetermined path (e.g., a circular path or a square path), and receiving the light bundle of the object image on a plurality of pixels having different detection colors. The user (photographer) can choose whether to use the LPF function by driving the image sensor in order to remove moire and false color via a manually setting, based on the user's preference or taste, or not to use the LPF function and not drive the image sensor in order not to deteriorate the resolving power or contrast. Incidentally, it is already known to remove moire or false color by utilizing a hand-hake correction mechanism in a digital camera which carries out hand-shake correction by LPF driving the image sensor; Patent Literature 1 is one such example.

CITATION LIST

Patent Literature

Patent Literature 1: Japanese Unexamined Patent Publication No. 2008-35241

SUMMARY OF THE INVENTION

Technical Problem

According to diligent research carried out by the present inventor, it was found that in the case where moire and false color is removed by utilizing a hand-shake correction mechanism, it is effective to move the image sensor in a circle having a diameter of approximately 1 pixel; however, since the drive signals for LPF driving the image sensor includes high-frequency components (e.g., 500 Hz), an unstable-operation period of time occurs in which the circular movement of the image sensor is unstable until a certain period of time from the commencement of the driving (supplying of drive signals to the image sensor) of the image sensor. If an exposure is carried out during this unstable-operation period of time, not only can an expected low-pass filter effect not be obtained, moire and false color cannot be stably removed due to differences in shutter speed and irregularities in the optical low-pass filter effect occurring per photographic frame, etc., so that the quality of the photographic images is noticeably deteriorated.

The present invention has been devised in view of the above-mentioned problems, and an object of the present invention is to provide a photographing apparatus and a photographing control method which can achieve a uniform optical low-pass filter effect having no irregularities without being adversely effected by a period of time during which the low-pass filter operation is unstable, which occurs upon the commencement of driving of the movable member (shake-correction member), and to obtain a high-quality photographic image with moire and false color stably removed.

Solution to Problem

A photographing apparatus of the present invention is provided, including an image sensor, which converts an object image that is formed by a photographing optical system into electrical pixel signals; a driver configured to obtain an optical low-pass filter effect via an object light-bundle being incident on a plurality of pixels of the image sensor by moving a movable member (shake-correction member) in a direction that is different from an optical axis of the photographing optical system, wherein the movable member includes at least one of a lens element, constituting part of the photographing optical system, and the image sensor; an exposure-commencement instructing device configured to provide an instruction to commence an exposure of the image sensor; and an exposure-commencement controller configured to commence a driving of the movable member via the driver upon the image sensor being instructed to commence an exposure by the exposure-commencement instructing device in a non-driving state of the movable member, performed by the driver, and after a predetermined unstable-operation period of time of the low-pass filter operation lapses from the commencement of the driving of the movable member, the exposure-commencement controller commences an exposure of the image sensor.

It is desirable for the photographing apparatus of the present invention to further comprising a second movable member configured to perform a photographing preliminary operation in the photographing apparatus upon the image sensor being instructed to commence an exposure by the exposure-commencement instructing device. The exposure-commencement controller commences a driving of the movable member via the driver while commencing the photographing preliminary operation by the second movable member, upon the image sensor being instructed to commence an exposure by the exposure-commencement instructing device in a non-driving state of the movable member, performed by the driver, and after a predetermined unstable-operation period of time of the low-pass filter operation lapses from the commencement of the driving of the movable member, the exposure-commencement controller commences an exposure of the image sensor.

The exposure-commencement controller can concurrently commence the photographing preliminary operation via the second movable member and the driving of the movable member via the driver.

Alternatively, the exposure-commencement controller can commence the photographing preliminary operation via the second movable member and commence a driving of the movable member via the driver at a displaced timing.

It is desirable for the second movable member to include a quick-return mirror configured to rotate between a mirror-down position and a mirror-up position, and for the exposure-commencement controller to commence a driving of the movable member via the driver while commencing a rotation of the quick-return mirror from the mirror-down position to the mirror-up position, when the quick-return mirror is at the mirror-down position and upon the image sensor being instructed to commence an exposure by the exposure-commencement instructing device in a non-driving state of the movable member, performed by the driver, and after a predetermined unstable-operation period of time of the low-pass filter operation lapses from the commencement of the driving of the movable member, the exposure-commencement controller commences an exposure of the image sensor.

The exposure-commencement controller can concurrently commence the rotation of the quick-return mirror from the mirror-down position to the mirror-up position and commence the driving of the movable member via the driver.

Alternatively, the exposure-commencement controller can commence the rotation of the quick-return mirror from the mirror-down position to the mirror-up position and commence the driving of the movable member via the driver at a displaced timing.

It is desirable for the predetermined unstable-operation period of time of the low-pass filter operation to be included in a time required to rotate the quick-return mirror from the mirror-down position to the mirror-up position.

A photographing control method of the present invention is provided, including an image sensor, which converts an object image that is formed by a photographing optical system into electrical pixel signals; and a driver configured to obtain an optical low-pass filter effect via an object light-bundle being incident on a plurality of pixels of the image sensor by moving a movable member (shake-correction member) in a direction that is different from an optical axis of the photographing optical system, wherein the movable member includes at least one of a lens element, constituting part of the photographing optical system, and the image sensor. The photographing control method includes instructing the image sensor to commence an exposure; and controlling a commencement of a driving of the movable member by the driver upon the image sensor being instructed to commence an exposure in a non-driving state of the movable member, performed by the driver, and after a predetermined unstable-operation period of time of the low-pass filter operation lapses from the commencement of the driving of the movable member, controlling a commencement of an exposure of the image sensor.

It is desirable for the photographing apparatus to further include a second movable member configured to perform a photographing preliminary operation in the photographing apparatus upon the image sensor being instructed to commence an exposure. A driving of the movable member is commenced via the driver while the photographing preliminary operation by the second movable member is commenced, upon the image sensor being instructed to commence an exposure in a non-driving state of the movable member, performed by the driver, and after a predetermined unstable-operation period of time of the low-pass filter operation lapses from the commencement of the driving of the movable member, an exposure of the image sensor is commenced.

The photographing preliminary operation via the second movable member and the driving of the movable member via mechanism driver can be concurrently commenced.

Alternatively, the photographing preliminary operation via the second movable member and the driving of the movable member via the driver can be commenced at a displaced timing.

It is desirable for the second movable member to include a quick-return mirror configured to rotate between a mirror-down position and a mirror-up position. A driving of the movable member is commenced via the driver while commencing a rotation of the quick-return mirror from the mirror-down position to the mirror-up position, when the quick-return mirror is at the mirror-down position and upon the image sensor being instructed to commence an exposure in a non-driving state of the movable member, performed by the driver, and after a predetermined unstable-operation period of time of the low-pass filter operation lapses from the commencement of the driving of the movable member, an exposure of the image sensor is commenced.

The rotation of the quick-return mirror from the mirror-down position to the mirror-up position and the driving of the movable member via the driver can be concurrently commenced.

Alternatively, the rotation of the quick-return mirror from the mirror-down position to the mirror-up position and the driving of the movable member via the driver are commenced at a displaced timing.

It is desirable for the predetermined unstable-operation period of time of the low-pass filter operation to be included in a time required to rotate the quick-return mirror from the mirror-down position to the mirror-up position.

Advantageous Effects of the Invention

According to the present invention, a photographing apparatus and a photographing control method, is provided, which can achieve a uniform optical low-pass filter effect having no irregularities without being adversely effected by a period of time during which the low-pass filter operation is unstable, which occurs upon the commencement of driving of the movable member (shake-correction member), and to obtain a high-quality photographic image with moire and false color stably removed

BRIEF DESCRIPTION OF DRAWINGS

FIG. 5 is a movement waveform diagram of the image sensor for explaining the period of time during which the low-pass filter operation, of the image sensor, is unstable.

FIG. 6 is a timing chart showing the photographing sequence performed by an exposure-commencement controller in the case where the photographing mode is set to a "still-image photographing mode" by the photographing mode setter.

FIG. 7 is a timing chart showing the photographing sequence performed by an image-quality priority consecutive-shooting controller in the case where the photographing mode is set to a "consecutive-shooting mode (continuous shooting mode or photographic bracketing mode)" and a "image-quality priority consecutive-shooting mode" by the photographing mode setter.

FIG. 8 is a timing chart showing the photographing sequence performed by a frame-speed priority consecutive-shooting controller in the case where the photographing mode is set to a "consecutive-shooting mode (continuous shooting mode or photographic bracketing mode)" and a "frame-speed priority consecutive-shooting mode" by the photographing mode setter.

EMBODIMENT

An embodiment of the photographing apparatus according to the present invention applied to a digital SLR camera 10 will be hereinafter discussed with reference to FIGS. 1 through 8.

Figure 1:
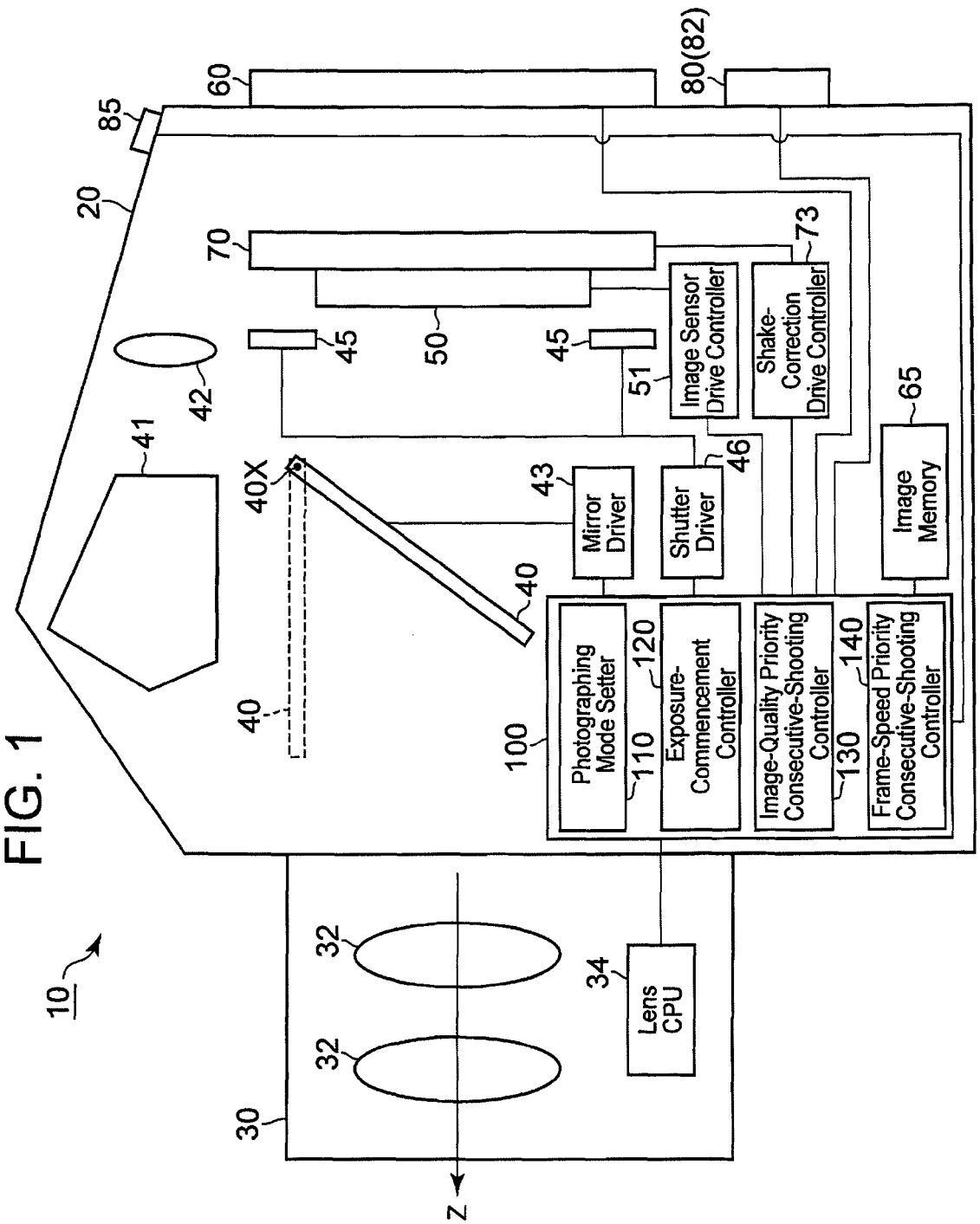
FIG. 1 is a schematic view showing a configuration of a digital SLR camera (photographing apparatus) according to the present invention.

As shown in FIG. 1, the digital camera 10 is provided with a camera body 20, and an interchangeable photographing lens 30 which is detachably attached to the camera body 20.

The interchangeable photographing lens 30 is provided with a photographing lens group (photographing optical system/movable member/image-shake correction member) 32, and a diaphragm (not shown in the drawings), in that order from the object side (left side of FIG. 1) to the image side (right side of FIG. 1). Furthermore, the interchangeable photographing lens 30 is provided with a lens CPU 34 which stores various information such as focusing information and lens-position information of the photographing lens group 32, and aperture information, etc., of the diaphragm (not shown in the drawings). In a state where the interchangeable photographing lens 30 is mounted onto the camera body 20, the various information stored by the lens CPU 34 is read into a camera CPU 100 of the camera body 20 via mount contacts (not shown in the drawings). Note that although FIG. 1 depicts the photographing lens group 32 as two lens elements, in practice the photographing lens group 32 can include three or more lens elements, e.g., a stationary lens element, a zoom lens element that moves during zooming, and a focusing lens element which moves during focusing, etc.

The camera body 20 is provided with a movable mirror (quick-return mirror/second movable member) 40, a shutter 45, and an image sensor (movable member/image-shake correction member) 50, in that order from the object side (left side of FIG. 1) to the image side (right side of FIG. 1). A pentaprism (finder optical system) 41 is provided above the movable mirror 40, and an eyepiece lens element (finder optical system) 42 is provided on the exit-surface side of the pentaprism 41.

The movable mirror 40 is configured by a mirror body (not shown in the drawings) being mounted in a mirror-holding frame (not shown in the drawings), and the movable mirror 40 is supported by being pivotally-rotatable about a rotational pivot 40X inside a mirror box (not shown in the drawings). The movable mirror 40 is rotatably drivable about the rotational pivot 40X, between a mirror-down position shown as a solid line in FIG. 1 and a mirror-up position shown as a broken line in FIG. 1, via a mirror driver 43 under the control of the camera CPU 100. When the movable mirror 40 is at the mirror-down position, the object-emanating light incident from the photographing lens group 32 reflects off the movable mirror 40 toward the pentaprism 41. The object-emanating light reflected by the movable mirror 40 is converted into an erected image by the pentaprism 41, and can be viewed from the eyepiece lens element 42. When the movable mirror 40 is at the mirror-up position, the object-emanating light incident from the photographing lens group 32 passes through the shutter 45 and toward the image sensor 50. When the movable mirror 40 is at the mirror-down position, a photographing operation via the image sensor 50 cannot be carried out; when the movable mirror 40 is at the mirror-up position, a photographing operation via the image sensor 50 can be carried out. When the image sensor is instructed to commence an exposure, upon a shutter-release button (exposure-commencement instructing device/consecutive-shooting commencement instructing device) 85 (described later) being depressed, with the movable mirror 40 in the mirror-down position, the movable mirror 40 rotates from the mirror-down position to the mirror-up position as a photographing preliminary operation, which is performed by the digital camera 10.

The shutter 45 is configured of two shutter curtains: a leading curtain and a trailing curtain. The shutter 45 allows object-emanating light to pass therethrough toward the image sensor 50 via the leading curtain and the trailing curtain being driven by a shutter driver 46 at a predetermined time difference under the control of the camera CPU 100. The exposure time is determined by the predetermined time difference by which the leading curtain and the trailing curtain of the shutter 45 are driven.

The driving of the image sensor 50 is controlled by an image-sensor drive controller 51 under the control of the camera CPU 100. When the movable mirror 40 is at the mirror-up position, the object image that is formed by the object-emanating light that is incident from the photographing lens group 32 and passes through the shutter 45 is formed onto a light-receiving surface of the image sensor 50. The object image that is formed on the light-receiving surface of the image sensor 50 is electrically converted into pixel signals via a large number of pixels, arranged in a matrix, and is output as image data to the camera CPU 100 via the image-sensor drive controller 51. The camera CPU 100 performs predetermined image processing on the image data that has been input therein from the image sensor 50; and this processed image data is displayed on an LCD 60 and is stored in an image memory 65. The image memory 65 refers to, e.g., a memory which can output image data to an external device such as a PC, etc., via a USB cable, or to a memory card, such as a flash memory, etc., which is insertable/removable from the digital camera 10 (camera body 20), and does not refer to a temporary storage memory (volatile memory) such as a DRAM, etc., for temporal storage for processing an image received during a live view to be displayed in the LCD 60.

Figure 2:
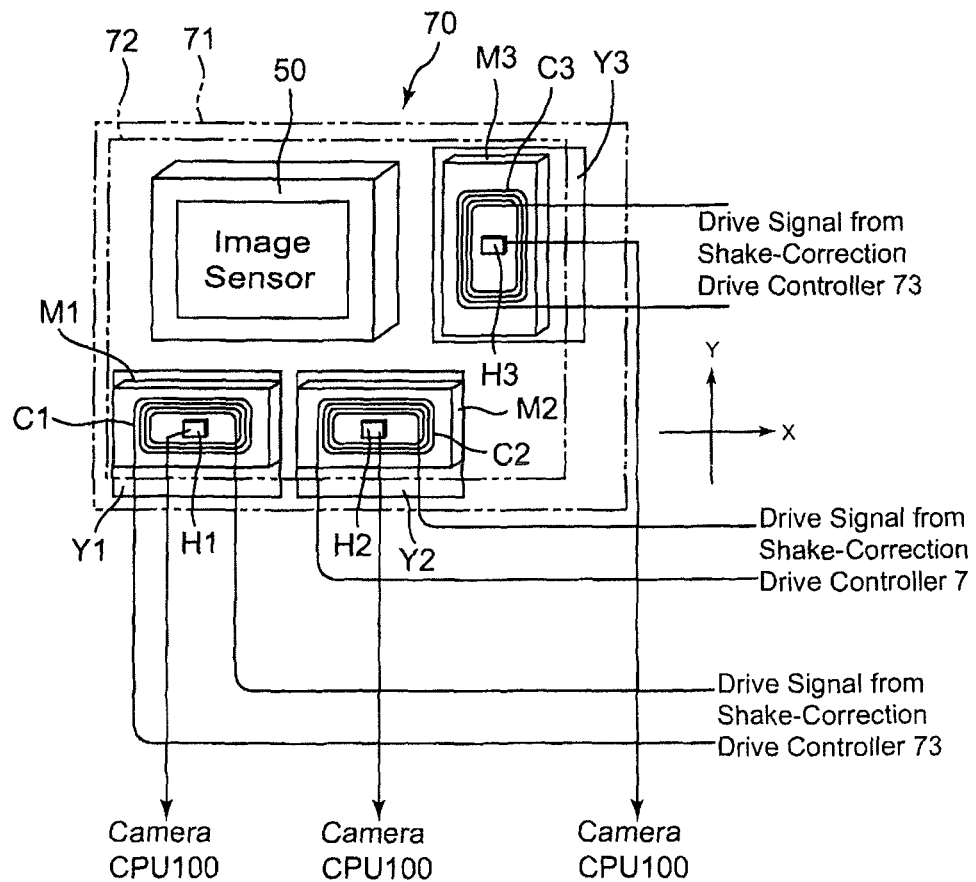
FIG. 2 is a block diagram showing a configuration of an image shake correcting device (driver).
Figure 3:
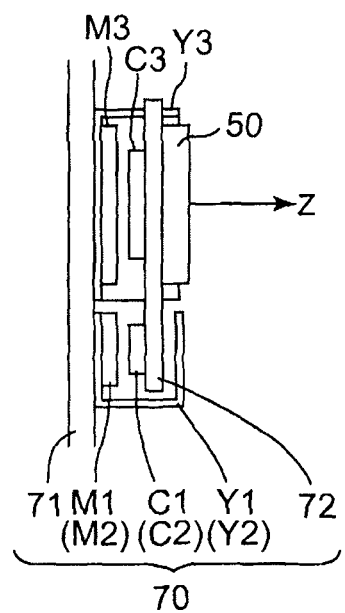
FIG. 3 is a side elevational view showing the configuration of an image shake correcting device (driver).

As shown in FIGS. 1 through 3, the image sensor 50 is mounted onto an image-shake correction device (driver) 70 so that the image sensor 50 is movable in an x-direction and a y-direction (two orthogonal directions), which are orthogonal to an optical axis Z of the photographing optical system. The image-shake correction device 70 is provided with a mount support plate 71 which is mounted onto a structural member such as a chassis, etc., of the camera body 20; a movable stage 72, onto which the image sensor 50 is mounted, which is slidable relative to the mount support plate 71; magnets M1, M2 and M3 mounted onto the mount support plate 71 on the side thereof that faces the movable stage 72; yokes Y1, Y2 and Y3 which are made of a magnetic material and are mounted onto the mount support plate 71 to face the magnets M1, M2 and M3 with the movable stage 72 positioned between the magnets M1, M2 and M3 and the yokes Y1, Y2 and Y3, thereby forming a magnetic circuit between the yokes Y1, Y2 and Y3 and the magnets M1, M2 and M3, respectively; and drive coils C1, C2 and C3, mounted onto the movable stage 72, which each generate a driving force by receiving an electric current within the magnetic field of the magnetic circuit. The movable stage 72 (image sensor 50) is driven relative to the mount support plate 71 within a plane that is orthogonal to the optical axis by applying alternating drive signals to the drive coils C1, C2 and C3. The alternating drive signals that are applied to the drive coils C1, C2 and C3 are controlled by the camera CPU 100 and are generated by a shake-correction drive controller (drive-signal generator) 73.

In the illustrated embodiment, a magnetic driver configured of the magnet M1, the yoke Y1 and the drive coil C1, and a magnetic driver configured of the magnet M2, the yoke Y2 and the drive coil C2 (two magnetic drivers) are arranged along a long-side direction (horizontal direction/x-direction) of the image sensor 50 at a predetermined distance therebetween; accordingly, the movable stage 72 can be driven in the y-direction. Furthermore, a magnetic driver configured of the magnet M3, the yoke Y3 and the drive coil C3 (one magnetic driver) is arranged along a short-side direction of the image sensor 50 orthogonal to the long-side direction thereof (vertical direction/y-direction); accordingly, the movable stage 72 can be driven in the x-direction.

The mount support plate 71 is further provided with Hall sensors H1, H2 and H3 arranged in the close vicinity of the drive coils C1, C2 and C3, respectively (within the central spaces thereof). The Hall sensors H1, H2 and H3 detect the magnetic force of the magnets M1, M2 and M3 and detect position detection signals, which indicate the position of the movable stage 72 (image sensor 50) in the optical-axis orthogonal plane. The y-directional position and inclination (rotation) of the movable stage 72 (image sensor 50) are detected by the Hall sensors H1 and H2, and the x-directional position of the movable stage 72 (image sensor 50) is detected by the Hall sensor H3. The camera CPU 100 controls, via the shake-correction drive controller 73, the driving of the image-shake correction device 70, which moves the image sensor 50 within a plane orthogonal to the optical axis, based on shake detection signals detected by the gyro sensor (not shown in the drawings) that indicate shake/vibrations applied to the camera body 20 in a plane orthogonal to the optical axis, and position-detection signals that indicate the position of the image sensor 50 within a plane orthogonal to the optical axis detected by the Hall sensors H1, H2 and H3. Accordingly, the imaging position of the object image on the image sensor 50 can be displaced to correct image shake that is caused by hand shake/vibrations. In the illustrated embodiment, this operation is referred to as an "image-shake correction operation (image-shake correction drive) of the image-sensor 50".

In the image-shake correction device 70 of the illustrated embodiment, the image sensor 50 is driven along a predetermined path in a plane that is orthogonal to the optical axis Z of the photographing optical system, to provide an optical low-pass filter effect (hereinafter referred to as a "LPF effect") by making an object light-bundle incident on a plurality of pixels, having different detection colors, of the image sensor 50. In the illustrated embodiment, this operation is referred to as a "low-pass filter operation (LPF operation/LPF driving) of the image sensor 50".

The image-shake correction device 70 of the illustrated embodiment carries out a "central-holding operation (central-holding drive) of the image sensor 50" which holds the image sensor 50 at the central position of the image-shake correction movement-range (image-shake correction driving-range). For example, when the "image-shake correction operation (image-shake correction drive) of the image-sensor 50" and the "LPF operation (LPF drive) of the image sensor 50" are both OFF, a photographing operation is performed with only the "central-holding operation (central-holding drive) of the image sensor 50" turned ON (even if image-shake correction is not carried out).

An embodiment is possible in which the "image-shake correction operation (image-shake correction drive) of the image-sensor 50", the "LPF operation (LPF drive) of the image sensor 50" and the "central-holding operation (central-holding drive) of the image sensor 50" are achieved as a combined operation (combined driving) thereof by the image-shake correction device 70, or in which only one of these operations are achieved by the image-shake correction device 70.

Figure 4:
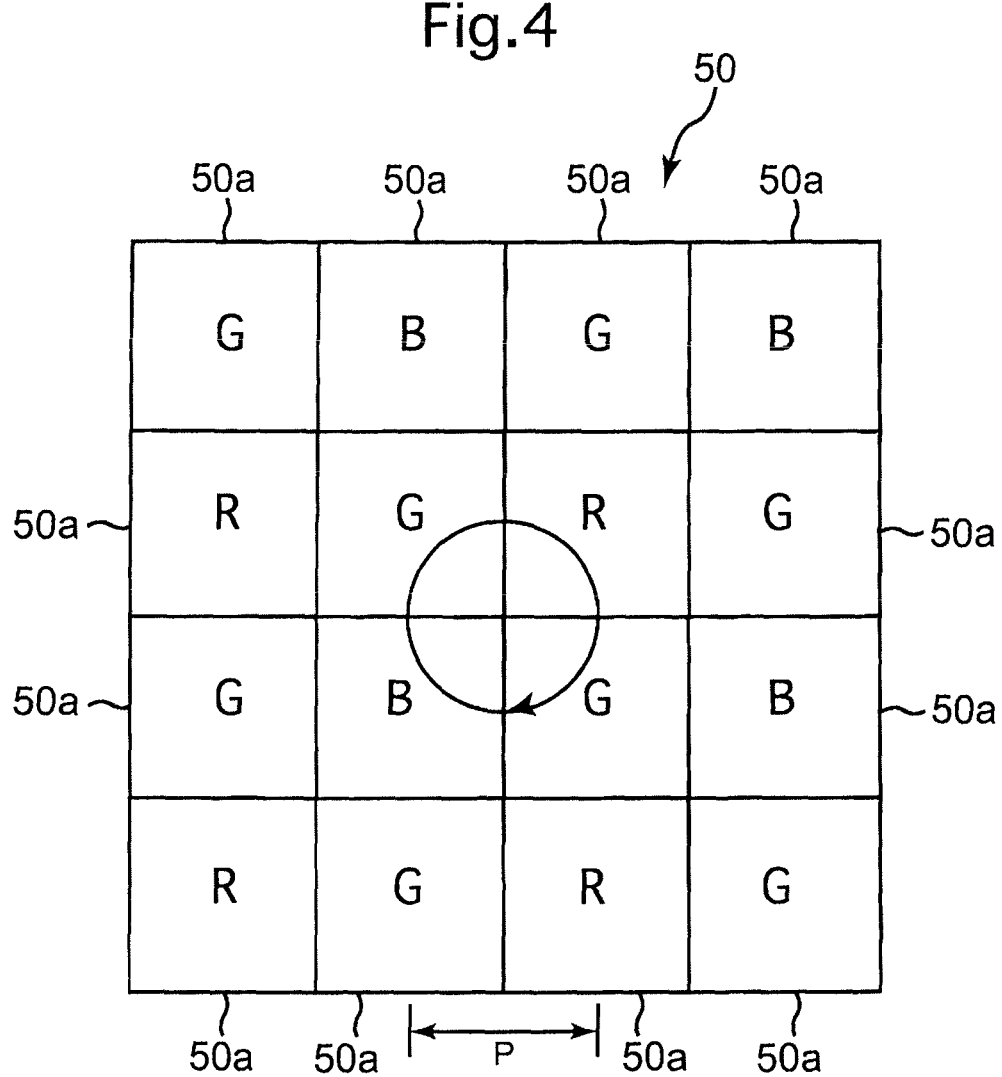
FIG. 4 is a diagram that indicates an optical low-pass filter effect that is provided by driving an image sensor to trace a rotationally symmetrical circular path about an optical axis of a photographing optical system.

The LPF operation for providing an LPF effect using the image sensor 50 via the image-shake correction device 70 driving the image sensor 50 in a circular path, which is rotationally symmetrical about the optical axis Z of the photographing optical system, will be hereinafter explained with reference to FIG. 4. In FIG. 4, the image sensor 50 is provided with a large number of pixels 50a arranged in a matrix form at a predetermined pixel pitch P on the light-receiving surface, and one color filter of color filters R, G and B, which are arranged in a Bayer array, is provided on a front surface of each pixel 50a. Each pixel 50a detects the color of the object light-rays that pass through one of the color filters R, G and B, on the front surface of the associated pixel 50a, and are incident thereon; namely, the color component (color zone) of the object light rays is photo-electrically converted and a charge corresponding to the strength (brightness) thereof is accumulated.

When the image sensor 50 is driven, during an exposure, along a predetermined circular path, since the object light rays (light bundle) that are equally incident on the center of each color filter R, G, B and G (pixels 50a) are incident on the four color filters R, G, B and G, a similar effect to that of an optical low-pass filter can be obtained. In other words, since the light rays that are incident on any of the color filters R, G, B and G (pixels 50a) are always also incident on surrounding color filters R, G, B and G (pixels 50a), an effect (LPF effect) that is the same as if the light rays are passing through an optical low-pass filter can be obtained.

Furthermore, by switching in a stepwise manner the driving range of the image sensor 50, i.e., the radius of the circular path that the image sensor 50 traces, the magnitude of the LPF effect carried out of the image sensor 50 can be switched in a stepwise manner. The LPF effect can be strengthened by increasing the radius of the circular path traced by the image sensor 50, and the LPF effect can be weakened by reducing the radius of the circular path traced by the image sensor 50. As shown in Table 1, in the illustrated embodiment, the driving range of the image sensor 50 together with the LPF effect can be switched between the four stages: "OFF", "Small", "Medium" and "Large". The driving range and of the image sensor 50 together with the LPF effect being "OFF" refers to the image sensor 50 not being driven, and hence refers to a state where no LPF effect can be obtained.

TABLE 1

| Driving Range of Image Sensor 50 | OFF | Small | Medium | Large |
|---|---|---|---|---|
| LPF Effect via Image Sensor 50 | OFF | Small | Medium | Large |

The LCD 60 is provided on the rear side of the camera body 20. The LCD 60 performs a real-time display of a live view image, a playback display of a photographed image (still image, movie, and various other kinds of images), and a display for confirming and changing various settings of the digital camera 10.

The rear side of the camera body 20 is provided with operational switches 80 for confirming and changing various settings of the digital camera 10. Various settings such as the aperture value, shutter speed, ISO sensitivity, flash, and self-timer, etc., can be performed by operating the operational switches 80. The operational switches 80 include an LPF operation switch 82 for performing a setting or switching operation of the driving range of the image sensor 50 together with the LPF effect out of one of the four stages: "OFF", "Small", "Medium" and "Large" of Table 1. Furthermore, the shutter-release button 85, for performing a photographing operation by the digital camera 10, is provided on a top surface of the camera body 20. The shutter-release button 85 is connected to the camera CPU 100 so that the shutter-release button 85 combined with the camera CPU 100 function as an "exposure-commencement instructing device" which provides an instruction to commence an exposure of the image sensor 50, and the shutter-release button 85 combined with the camera CPU 100 also function as a "consecutive-shooting commencement instructing device" which provides an instruction to commence a consecutive-shooting operation via commencement of an exposure of the image sensor 50. With regard to the "exposure-commencement instructing device" and the "consecutive-shooting commencement instructing device", a timer button, a switch, a dial and/or a touch panel (not shown in the drawings) can be alternatively provided as an equivalent to the shutter-release button 85.

The camera CPU 100 is provided with a photographing mode setter 110, an exposure-commencement controller (consecutive-shooting commencement controller) 120, an image-quality priority consecutive-shooting controller 130, and a frame-speed priority consecutive-shooting controller 140.

The photographing mode setter 110 carries out a photographing mode setting via the digital camera 10 in accordance with an operation of the operational switches 80, carried out by a user (photographer).

The photographing mode setter 110 can perform one of a "still-image photographing mode" setting, a "continuous-shooting mode (consecutive-shooting mode)" setting, and a "bracketing photographic mode (consecutive-shooting mode)" setting, as a photographing mode via the digital camera 10. Furthermore, the photographing mode setter 110 can, in addition to the above-mentioned photographing modes, also perform, e.g., a "movie-shooting mode" setting and a "HDR (High Dynamic Range) photographing mode" setting. In addition, the photographing mode setter 110 can perform a "live-view mode" setting as a photographing standby mode of the above-mentioned photographing modes.

In the "continuous-shooting mode (consecutive-shooting mode)" or the "bracketing photographic mode (consecutive-shooting mode)", the photographing mode setter 110 can also set one of an "image-quality priority continuous-shooting mode" or a "frame-speed priority consecutive shooting mode".

In the present specification, the "still-image photographing mode" refers to a photographing mode which, upon the shutter-release button 85 being fully-depressed once, the movable mirror 40 is made to be positioned at the mirror-up position via the mirror driver 43, the shutter 45 is opened once in accordance with predetermined exposure conditions (aperture value and shutter speed), one still image of the object is photographed (single-frame photography) by performing an exposure of the image sensor 50 and image-data retrieval from the image sensor 50 as one set of operations, and this still image being stored in a memory (image memory 65).

In the present specification, the "continuous-shooting mode (consecutive-shooting mode)" refers to a photographing mode which, upon the shutter-release button 85 being fully-depressed continuously and during the time when the shutter-release button 85 is fully-depressed, the movable mirror 40 is repeatedly rotated between the mirror-down position and the mirror-up position via the mirror driver 43 while the shutter 45 is repeatedly opened and closed in accordance with predetermined exposure conditions (aperture value and shutter speed), a plurality of still images of the object are photographed by repeatedly performing a plurality of sets an exposure of the image sensor 50 and image-data retrieval from the image sensor 50 alternately, and these still images being stored in a memory (image memory 65).

In the present specification, the "bracketing photographic mode (consecutive-shooting mode)" refers to a photographing mode which, upon the shutter-release button 85 being fully-depressed once, the movable mirror 40 is repeatedly rotated between the mirror-down position and the mirror-up position via the mirror driver 43 while the shutter 45 is repeatedly opened and closed by a predetermined number of times while changing the exposure conditions (aperture value and shutter speed), a plurality of still images of differing exposures of the object are photographed by repeatedly performing a plurality of sets of an exposure of the image sensor 50 and image-data retrieval from the image sensor 50 alternately, and these still images being stored in a memory (image memory 65).

In the present specification, the "image-quality priority continuous-shooting mode" refers to a photographing mode, in the "continuous-shooting mode (consecutive-shooting mode)" or the "bracketing photographic mode (consecutive-shooting mode)", which stably removes moire and false color by an LPF driving of the image sensor 50 without deteriorating the quality of the photographed image. Details of the specific control of the "image-quality priority continuous-shooting mode" will be described later.

In the present specification, the "frame-speed priority consecutive shooting mode" refers to a photographing mode which removes moire and false color by an LPF driving of the image sensor 50 without reducing the frame speed of the consecutive shooting operation. Details of the specific control of the "frame-speed priority consecutive shooting mode" will be described later.

Upon an instruction to commence an exposure of the image sensor 50 via the shutter-release button (exposure-commencement instructing device) 85, in a non LPF driving state of the image sensor 50 (that is performed by the image-shake correction device 70), the exposure-commencement controller 120 commences the LPF driving of the image sensor 50 via the image-shake correction device 70, and after a predetermined unstable-operation period of time of the low-pass filter operation lapses from the commencement of driving of the image sensor 50, an exposure of the image sensor 50 commences.

More specifically, upon an instruction to commence an exposure at the image sensor 50 via the shutter-release button (exposure-commencement instructing device) 85, in a state where the movable mirror 40 is at the mirror-down position and in a non LPF driving state of the image sensor 50 (that is performed by the image-shake correction device 70), the exposure-commencement controller 120 commences to rotate the movable mirror 40 from the mirror-down position to the mirror-up position and commences an LPF driving of the image sensor 50 via the image-shake correction device 70, and after a predetermined unstable-operation period of time of the low-pass filter operation lapses from the commencement of driving of the image sensor 50, an exposure of the image sensor 50 commences.

Thereupon, the exposure-commencement controller 120 concurrently commences the rotation of the movable mirror 40 from the mirror-down position to the mirror-up position and the LPF driving of the image sensor 50, via the image-shake correction device 70. In the present embodiment, since the time required to rotate the movable mirror 40 from the mirror-down position to the mirror-up position (e.g., 100 ms) is longer than the unstable-operation period of time of the low-pass filter operation of the image sensor 50 (e.g., 30 ms), the unstable-operation period of time of the low-pass filter operation of the image sensor 50 is included the time required to rotate the movable mirror 40 from the mirror-down position to the mirror-up position. Therefore, by the time the rotation of the movable mirror 40 from the mirror-down position to the mirror-up position is completed, the unstable-operation period of time of the low-pass filter operation of the image sensor 50 has always lapsed, so that a release time-lag, for waiting for the unstable-operation period of time of the low-pass filter operation of the image sensor 50, never occurs.

Alternatively, the exposure-commencement controller 120 can commence the rotation of the movable mirror 40 from the mirror-down position to the mirror-up position and commence the LPF filter driving of the image sensor 50 (via the image-shake correction device 70) at a displaced timing. For example, the exposure-commencement controller 120 can commence the LPF filter driving of the image sensor 50 (via the image-shake correction device 70) after commencing rotation of the movable mirror 40 from the mirror-down position to the mirror-up position. Supposing the time required to rotate the movable mirror 40 from the mirror-down position to the mirror-up position is 100 ms and the unstable-operation period of time of the low-pass filter operation of the image sensor 50 is 30 ms, if the LPF filter driving of the image sensor 50 (via the image-shake correction device 70) is commenced within 70 ms after the rotation of the movable mirror 40 from the mirror-down position to the mirror-up position commences, the unstable-operation period of time of the low-pass filter operation of the image sensor 50 is included the time required to rotate the movable mirror 40 from the mirror-down position to the mirror-up position. Therefore, by the time the rotation of the movable mirror 40 from the mirror-down position to the mirror-up position is completed, the unstable-operation period of time of the low-pass filter operation of the image sensor 50 has always lapsed, so that a release time-lag, for waiting for the unstable-operation period of time of the low-pass filter operation of the image sensor 50, never occurs.

Upon the exposure-commencement controller (consecutive-shooting commencement controller) 120 being instructed to commence a consecutive-shooting operation (continuous shooting or photographic bracketing) via commencement of an exposure of the image sensor 50 via the shutter-release button (consecutive-shooting commencement instructing device) 85, in a non LPF driving state of the image sensor 50 (that is performed by the image-shake correction device 70), an LPF driving of the image sensor 50 via the image-shake correction device 70 is commenced, and after a predetermined unstable-operation period of time of the low-pass filter operation lapses from the commencement of the LPF driving of the image sensor 50, a consecutive-shooting operation (continuous shooting or photographic bracketing) is commenced via commencement of an exposure of the image sensor 50.

More specifically, upon an instruction to commence a consecutive-shooting operation (continuous shooting or photographic bracketing) via commencement of an exposure of the image sensor 50 via the shutter-release button (consecutive-shooting commencement instructing device) 85, in a state where the movable mirror 40 is at the mirror-down position and in a non LPF driving state of the image sensor 50 (that is performed by the image-shake correction device 70), the exposure-commencement controller (consecutive-shooting commencement controller) 120 commences to rotate the movable mirror 40 from the mirror-down position to the mirror-up position and commences an LPF driving of the image sensor 50 via the image-shake correction device 70, and after a predetermined unstable-operation period of time of the low-pass filter operation lapses from the commencement of driving of the image sensor 50, commences a consecutive-shooting operation (continuous shooting or photographic bracketing) via commencement of an exposure of the image sensor 50.

Thereupon, the exposure-commencement controller (consecutive-shooting commencement controller) 120 concurrently commences a rotation of the movable mirror 40 from the mirror-down position to the mirror-up position and a LPF driving of the image sensor 50, via the image-shake correction device 70. In the present embodiment, since the time required to rotate the movable mirror 40 from the mirror-down position to the mirror-up position (e.g., 100 ms) is longer than the unstable-operation period of time of the low-pass filter operation of the image sensor 50 (e.g., 30 ms), the unstable-operation period of time of the low-pass filter operation of the image sensor 50 is included the time required to rotate the movable mirror 40 from the mirror-down position to the mirror-up position. Therefore, by the time the rotation of the movable mirror 40 from the mirror-down position to the mirror-up position is completed, the unstable-operation period of time of the low-pass filter operation of the image sensor 50 has always lapsed, so that a release time-lag, for waiting for the unstable-operation period of time of the low-pass filter operation of the image sensor 50, never occurs.

Alternatively, the exposure-commencement controller (consecutive-shooting commencement controller) 120 can commence the rotation of the movable mirror 40 from the mirror-down position to the mirror-up position and commence the LPF filter driving of the image sensor 50 (via the image-shake correction device 70) at a displaced timing. For example, the exposure-commencement controller (consecutive-shooting commencement controller) 120 can commence an LPF filter driving of the image sensor 50 (via the image-shake correction device 70) after commencing a rotation of the movable mirror 40 from the mirror-down position to the mirror-up position. Supposing the time required to rotate the movable mirror 40 from the mirror-down position to the mirror-up position is 100 ms and the unstable-operation period of time of the low-pass filter operation of the image sensor 50 is 30 ms, if the LPF filter driving of the image sensor 50 (via the image-shake correction device 70) is commenced within 70 ms after the rotation of the movable mirror 40 from the mirror-down position to the mirror-up position commences, the unstable-operation period of time of the low-pass filter operation of the image sensor 50 is included in the time required to rotate the movable mirror 40 from the mirror-down position to the mirror-up position. Therefore, by the time the rotation of the movable mirror 40 from the mirror-down position to the mirror-up position is completed, the unstable-operation period of time of the low-pass filter operation of the image sensor 50 has always lapsed, so that a release time-lag, for waiting for the unstable-operation period of time of the low-pass filter operation of the image sensor 50, never occurs.

In the case where the "image-quality priority continuous-shooting mode" has been set by the photographing mode setter 110, the image-quality priority consecutive-shooting controller 130 controls the consecutive-shooting process from the consecutive-shooting commencement process onwards (from the first exposure onwards) that is performed by the exposure-commencement controller (consecutive-shooting commencement controller) 120.

More specifically, the image-quality priority consecutive-shooting controller 130 controls the image sensor 50 to enter a non LPF driving state of the image sensor 50 (that is performed by the image-shake correction device 70) while the image data is being read out from the image sensor 50, and each time the reading out of the image data from the image sensor is completed, the image-quality priority consecutive-shooting controller 130 recommences the LPF driving of the image sensor 50 (that is performed by the image-shake correction device 70), and after a predetermined unstable-operation period of time of the low-pass filter operation lapses from the commencement of LPF driving of the image sensor 50, image-quality priority consecutive-shooting controller 130 recommences an exposure of the image sensor 50.

In the case where the "frame-speed priority consecutive shooting mode" has been set by the photographing mode setter 110, the frame-speed priority consecutive-shooting controller 140 controls the consecutive-shooting process from the consecutive-shooting commencement process onwards (from the first exposure onwards) that is performed by the exposure-commencement controller (consecutive-shooting commencement controller) 120.

More specifically, the frame-speed priority consecutive-shooting controller 140 continues the LPF driving of the image sensor 50 (via the image-shake correction device 70) through the period during which the exposures of the image sensor 50 and the reading out of the image data from the image sensor 50 alternate repeatedly.

The unstable-operation period of time of the low-pass filter operation of the image sensor 50 will be herein described with reference to FIG. 5. FIG. 5 shows a movement waveform diagram of the image sensor 50 after commencement of the LPF driving of the image sensor 50, via the image-shake correction device 70 (after the supply of drive signals generated by the shake-correction drive controller 73 to the image-shake correction device 70 has commenced). In order to circularly move the image sensor 50, it is necessary to drive the image sensor 50 concurrently in an x-direction and a y-direction while maintaining a 90° phase therebetween.

Since a high-frequency component having a several hundreds of Hz (e.g., 500 Hz) is included in the drive signal for LPF driving of the image sensor 50, the movement waveform of the x-direction and the y-direction is unsettled during a predetermined time from the commencement of the LPF driving (supply of drive signals) of the image sensor 50, which is an unstable-operation period of time of the low-pass filter operation in which the circular movement of the image sensor 50 is unstable. If an exposure is carried out during this unstable-operation period of time of the low-pass filter operation, an expected low-pass filter effect cannot be obtained, and/or irregularities in the optical low-pass filter effect occur per photographic frame, etc., so that moire and false color cannot be stably removed, and the quality of the photographic images are noticeably deteriorated. After the unstable-operation period of time of the low-pass filter operation lapses, since the movement waveform the of the x-direction and the y-direction becomes consistent so that the circular movement of the image sensor 50 becomes stable, a uniform optical low-pass filter effect having no irregularities is achieved so that moire and false color can be stably removed.

Furthermore, since the unstable-operation period of time of the low-pass filter operation of the image sensor 50 differs depending on the specifications of the image sensor 50, the image-shake correction device 70 and the shake-correction drive controller 73, it is desirable for the exposure-commencement controller 120 and the image-quality priority consecutive-shooting controller 130 of the camera CPU 100 of each digital camera 10 to retain a pre-calculated unstable-operation period of time of the low-pass filter operation of the image sensor 50.

The photographing sequence carried out by the exposure-commencement controller 120 in the case where the "still-image photographing mode" is set by the photographing mode setter 110 will be described hereinafter with reference to the timing chart of FIG. 6. In the initial state before the sequence has commenced, the setting of the LPF function, via the driving of the image sensor 50, is ON (the driving range of the image sensor 50 together with the LPF effect is set to one of "Small", "Medium" and "Large" of Table 1). Furthermore, the shutter-release button 85 is not depressed, the movable mirror 40 is at the mirror-down position (is not set to the live view mode), the shutter 45 is closed, an exposure is not carried out by the image sensor 50, image data is not read out from the image sensor 50, and an image-shake correction operation and an LPF operation of the image sensor 50 are not carried out.

Upon the shutter-release button 85 being depressed and turned ON, after exposure pre-processes such as photometering and exposure calculations are carried out, the movable mirror 40 starts to rotate from the mirror-down position to the mirror-up position (T1). Concurrently with this operation, an image-sensor positional centering control, via the image-shake correction device 70, commences in order to align the center of the image sensor 50 with the optical axis of the photographing optical system. At this stage, the image-shake correction device 70 starts a circular movement (LPF operation) of a 1 pixel diameter for removing moire and false color, in addition to the driving that moves the image sensor 50 in a plane that is orthogonal to the optical axis. In other words, a signal that applies a 1 pixel diameter oscillation at, e.g., 500 Hz is overlapped with the actuator output while the image-sensor positional centering control is performed via the image-shake correction device 70. As described with reference to FIG. 5, since even upon the LPF driving (circular driving) of the image sensor 50 commencing the oscillation thereof is not stable straightaway, the movement of the image sensor 50 during the unstable-operation period of time of the low-pass filter operation during T1 through T2 (the diagonal line segment) does not constitute a correct circular movement. Although it is necessary to stabilize this unstable movement by the time exposure commences, since the unstable-operation period of time of the low-pass filter operation is shorter than the mirror-up time, the circular movement in the LPF function (moire and false color removal function) operates without any problems by the time the mirror-up operation has completed.

Upon completion of the mirror-up operation of the movable mirror 40, if the hand-shake correction function is ON, the image-shake correction device 70 commences a hand-shake correction control, which drives the image sensor 50 in accordance with the hand-shake amount. In the case where the hand-shake correction function is OFF, the position of the image sensor 50 is controlled to be centered on the optical axis. However, in either case, the LPF driving (circular movement for removing moire and false color) of the image sensor 50 continues. Thereafter, an exposure commences by driving the leading curtain, and the trailing curtain upon the period of time of a set shutter speed lapsing. The time interval between the leading curtain and the trailing curtain indicated by diagonal lines corresponds to the amount of exposure.

The exposure ends (T3) together with the completion of a hand-shake correction driving and an LPF driving via the image-shake correction device 70, and the image-shake correction device 70 centers the image sensor 50 on the optical axis; this operation is performed so that noise from the driving of the image-shake correction device 70 does not occur during the reading out of the image data, that is carried out thereafter. Furthermore, upon the completion of an exposure, the reading out of the image data is commenced, and a control is carried out for returning the movable mirror 40 to a mirror-down position and returning the shutter 45 to a charged state in preparation for a subsequent exposure. If the reading out of the image data has ended (T4), since the influence of noise on the image goes away, the image sensor 50 returns to the initial position via the driving of the image-shake correction device 70, and the photographing sequence ends.

As mentioned above, by commencing the LPF driving of the image sensor 50 before the unstable-operation period of time component of the low-pass filter operation of a commenced exposure, a stable circular movement of the image sensor 50 can be obtained during an exposure while a sufficient LPF function (moire and false color removal function) can be utilized. Furthermore, due to the low-pass filter unstable-operation period of time overlapping the mirror-up time, the LPF function (moire and false color removal function) can be used without the release time lag from when the shutter-release button 85 is turned ON to when an exposure commences.

The photographing sequence carried out by the image-quality priority consecutive-shooting controller 130 in the case where the "consecutive-shooting mode (continuous shooting mode or photographic bracketing mode)" and a "image-quality priority consecutive-shooting mode" are set by the photographing mode setter 110 will be described hereinafter with reference to the timing chart of FIG. 7. In the initial state before the sequence has commenced, the setting of the LPF function, via the driving of the image sensor 50, is ON (the driving range of the image sensor 50 together with the LPF effect is set to one of "Small", "Medium" and "Large" of Table 1). Furthermore, the shutter-release button 85 is not depressed, the movable mirror 40 is at the mirror-down position (is not set to the live view mode), the shutter 45 is closed, an exposure is not carried out at the image sensor 50, image data is not read out from the image sensor 50, and an image-shake correction operation and an LPF operation of the image sensor 50 are not carried out.

Upon the shutter-release button 85 being depressed and turned ON, after exposure pre-processes such as photometering and exposure calculations are carried out, the movable mirror 40 starts to rotate from the mirror-down position to the mirror-up position (T1). Concurrently with this operation, an image-sensor positional centering control, via the image-shake correction device 70, commences in order to align the center of the image sensor 50 with the optical axis of the photographing optical system. At this stage, the image-shake correction device 70 starts a circular movement (LPF operation) of a 1 pixel diameter for removing moire and false color, in addition to the driving that moves the image sensor 50 in a plane that is orthogonal to the optical axis. In other words, a signal that applies a 1 pixel diameter oscillation at, e.g., 500 Hz is overlapped with the actuator output while the image-sensor positional centering control is performed via the image-shake correction device 70. As described with reference to FIG. 5, since even upon the LPF driving (circular driving) of the image sensor 50 commencing the oscillation thereof is not stable straightaway, the movement of the image sensor 50 during the unstable-operation period of time of the low-pass filter operation during T1 through T2 (the diagonal line segment) does not constitute a correct circular movement. Although it is necessary to stabilize this unstable movement by the time exposure commences, since the unstable-operation period of time of the low-pass filter operation is shorter than the mirror-up time, the circular movement in the LPF function (moire and false color removal function) operates without any problems by the time the mirror-up operation has completed.

Upon completion of the mirror-up operation of the movable mirror 40, if the hand-shake correction function is ON, the image-shake correction device 70 commences a hand-shake correction control, which drives the image sensor 50 in accordance with the hand-shake amount. In the case where the hand-shake correction function is OFF, the position of the image sensor 50 is controlled to be centered on the optical axis. However, in either case, the LPF driving (circular movement for removing moire and false color) of the image sensor 50 continues. Thereafter, an exposure commences by driving the leading curtain, and the trailing curtain upon the period of time of a set shutter speed lapsing. The time interval between the leading curtain and the trailing curtain indicated by diagonal lines corresponds to the amount of exposure.

The exposure ends (T3) together with the completion of a hand-shake correction driving and an LPF driving via the image-shake correction device 70, and the image-shake correction device 70 centers the image sensor 50 on the optical axis; this operation is performed so that noise from the driving of the image-shake correction device 70 does not occur during the reading out of the image data, that is carried out thereafter. Furthermore, upon the completion of an exposure, the reading out of the image data is commenced, and a control is carried out for returning the movable mirror 40 to a mirror-down position and returning the shutter 45 to a charged state in preparation for a subsequent exposure.

Upon the reading out of the image data ending (T4), the LPF driving of the image sensor 50 is recommenced for a subsequent exposure. After waiting for the unstable-operation period of time of the low-pass filter operation to lapse, the leading curtain is driven to thereby commence an exposure while recommencing the hand-shake correction control, via the image-shake correction device 70 (T5). From the commencement of an exposure, the processes T2 through T5 are repeated while a consecutive photographing operation continues.

Upon detection of the consecutive photographing operation ending by the shutter-release button 85 being turned OFF, the image sensor 50 returns to the initial position upon reading out of the last frame of the image data ending (T6), and the photographing sequence ends.

As mentioned above, in the case where the "image-quality priority consecutive-shooting mode" is set, the LPF driving of the image sensor 50 is stopped during the reading out of the image data, and the exposure at the image sensor 50 is stopped during the unstable-operation period of time of the low-pass filter operation of the image sensor 50. Accordingly, adverse influence of noise caused by the driving of the image-shake correction device 70 can be suppressed to a minimum, a uniform optical low-pass filter effect having no irregularities can be achieved, and a high-quality photographic image can be obtained by stably removing moire and false color.

The photographing sequence carried out by the frame-speed priority consecutive-shooting controller 140 in the case where the "consecutive-shooting mode (continuous shooting mode or photographic bracketing mode)" and the "frame-speed priority consecutive-shooting mode" are set by the photographing mode setter 110 will be described hereinafter with reference to the timing chart of FIG. 8.

The photographing sequence of the "frame-speed priority consecutive-shooting mode" is the same as the photographing sequence of the "image-quality priority consecutive-shooting mode" from the shutter-release button 85 being turn ON until the first time an exposure ends (T3). However, the LPF driving of the image sensor 50 continues after the first time an exposure ends. Furthermore, this LPF driving of the image sensor 50 continues until the shutter-release button 85 is turned OFF and the consecutive photographing operation ends. Therefore, since an unstable-operation period of time of the low-pass filter operation (at the commencement of LPF driving of the image sensor 50) does not occur during exposures that are carried out the second time onwards, exposures and reading out of image data can be consecutively repeated, thereby shortening the frame intervals of the consecutive photographing operation so that an increased frame speed can be achieved.

As mentioned above, in the case where the "frame-speed priority consecutive shooting mode" is set, since the LPF driving of the image sensor 50 continues also during the reading out of the image data, the image quality deteriorates somewhat; however, from the second exposure onwards, since there is no need to wait for unstable-operation period of time of the low-pass filter operation when the LPF driving of the image sensor 50 commences, a consecutive photographing operation can be carried out at a frame speed of maximum performance.

Accordingly, in the digital camera (photographing apparatus) 10 of the present embodiment, when the exposure-commencement controller 120 is instructed to commence an exposure at the image sensor 50 by the shutter-release button (exposure-commencement instructing device) 85 in a non-LPF driving state of the image sensor (movable member/image-shake correction member) 50, via the image-shake correction device (driver) 70, the exposure-commencement controller 120 commences a LPF driving of the image sensor 50, via the image-shake correction device 70, and after a predetermined unstable-operation period of time of the low-pass filter operation lapses from the commencement of LPF driving of the image sensor 50, the exposure-commencement controller 120 commences an exposure of the image sensor 50. Accordingly, a uniform optical low-pass filter effect having no irregularities can be achieved without being adversely effected by a period of time during which the low-pass filter operation is unstable, which occurs upon the commencement of driving of the image sensor 50, and a high-quality photographic image can be obtained by stably removing moire and false color.

Furthermore, since it is possible to set, out of the consecutive photographing modes that consecutively photograph an object, one of the "image-quality priority consecutive-shooting mode" that prioritizes the quality of the photographed image and the "frame-speed priority consecutive-shooting mode" that prioritizes the frame speed of the consecutive photographing operation, due to the photographing mode setter 110 repeatedly alternating between exposing the image sensor 50 and reading out image data from the image sensor 50, this configuration can be applied in a versatile manner in accordance with the user's photographic taste, by either prioritizing the photographed image quality or the frame speed of the consecutive photographing operation.

Furthermore, when the image-quality priority consecutive-shooting controller (image-quality priority consecutive-shooting control device) 130 has been set to the "image-quality priority consecutive-shooting mode" by the photographing mode setter 110, the image-quality priority consecutive-shooting controller 130 controls the image sensor (movable member/image-shake correction member) 50 to enter a non LPF driving state of the image sensor 50 (that is performed by the image-shake correction device (driver) 70) while the image data is being read out from the image sensor 50; and whenever the reading out of the image data from the image sensor 50 ends, the image-quality priority consecutive-shooting controller 130 recommences the LPF driving of the image sensor 50, via the image-shake correction device 70, and after a predetermined unstable-operation period of time of the low-pass filter operation lapses from the recommencement of LPF driving of the image sensor 50, recommences an exposure of the image sensor 50. Accordingly, in a consecutive-shooting mode such as the continuous-shooting mode or the bracketing photographic mode, moire and false color can be stably removed without deteriorating the quality of the photographed image.

In the above-described embodiment, an example is described in which the image sensor 50 is driven in a plane that is orthogonal to the optical axis, with the image sensor 50 acting as a "movable member/shake-correction member"; however, the present invention is not limited thereto. For example, it is possible for a lens element constituting part of the photographing lens group (photographing optical system) 32 to serve as a "movable member/shake-correction member", in which this lens element (optical element) is driven in a plane that is orthogonal to the optical axis by a voice coil motor (drive mechanism) provided within the interchangeable photographing lens 30. Alternatively, it is possible for both the image sensor 50 and a lens element constituting part of the photographing lens group (photographing optical system) 32 to serve as a "movable member/shake-correction member", which is driven in a plane that is orthogonal to the optical axis. In either configuration, image shake can be corrected by displacing the imaging position of an object image on the image sensor 50, while obtaining an optical low-pass filter effect with the object light bundle incident on a plurality of pixels, having different detection colors, of the image sensor 50.

Although in the above-described embodiment an example is given in which the image sensor (movable member/image-shake correction member) 50 is driven, via the image-shake correction device (drive mechanism) 70, in a plane that is orthogonal to the optical axis in order to carry out an image-shake correction operation and an LPF operation, the direction in which the image sensor 50 is to be driven is not limited to such a direction, so long as the direction is different to that of the optical axis of the photographing optical system.

Although in the above-described embodiment an example is given in which the predetermined path traced by the image sensor 50 is a circular path that is rotationally symmetrical about the optical axis Z of the photographing optical system, the predetermined path is not limited thereto. For example, a square path that is rotationally symmetrical about the optical axis Z of the photographing optical system or a reciprocal linear-movement path on a plane that is orthogonal to the optical axis Z of the photographing optical system are also acceptable.

Although in the above-described embodiment an example is given in which the photographing mode setter 110 can set to one of an "image-quality priority continuous-shooting mode" or a "frame-speed priority consecutive shooting mode", the present invention can be applied to the case where the photographing mode setter 110 only selects the "image-quality priority continuous-shooting mode".

Although in the above-described embodiment an example is given in which the image-shake correction device (drive mechanism) 70 is configured by the magnets M1, M2 and M3 and the yokes Y1, Y2 and Y3 being mounted onto the mount support plate 71, and the drive coils C1, C2 and C3 being mounted onto the mount support plate 71, the positional relationship thereof can be reversed by mounting the magnets and the yokes onto the movable stage and mounting the drive coils onto the mount support plate.

Although in the above-described embodiment an example is given in which the body 20 and the interchangeable photographing lens 30 are detachably attached to each other (lens interchangeable), a configuration is possible in which the body 20 and the interchangeable photographing lens 30 are not detachably attached (non lens-interchangeable).

In the above-described embodiment an example is given in which the photographing apparatus of the present invention is applied to the digital SLR camera 10 provided with the movable mirror (quick-return mirror) 40. However, the photographing apparatus of the present invention can likewise also be applied to a so-called mirrorless digital camera, in which a movable mirror (quick-return mirror) is omitted. In such a case, although the time required for rotating a movable mirror from the mirror-down position to the mirror-up position does not exist, by overlapping the unstable-operation period of time of the low-pass filter operation of the image sensor with the time taken to perform a photographing preliminary operation that is required in the mirrorless camera (e.g., an AF operation, a diaphragm control operation and a flash-emitting operation, etc., that are performed while the shutter-release button is depressed by a half-step), a release time-lag, for waiting for the unstable-operation period of time of the low-pass filter operation of the image sensor 50, can be prevented.

Although in the above-described embodiment an example is given in which the driving range of the image sensor 50 together with the LPF effect can be switched between the four stages: "OFF", "Small", "Medium" and "Large", it possible to set the driving range of the image sensor 50 together with the LPF effect more broadly or more finely. For example, a configuration in which the driving range of the image sensor 50 together with the LPF effect is switched between two stages such as "OFF" and "ON", or a configuration in which the driving range of the image sensor 50 together with the LPF effect is switched between seven stages such as "OFF", "1", "2", "3", "4", "5" and "6" (the larger the number the greater the driving range of the image sensor 50 together with the LPF effect) is possible.

Although the digital camera 10 has been described herein as a photographing apparatus to which the present invention is applied, the present invention can also be applied to any device which includes a lens system, an image sensor and an image processor, for example: a smart device that is provided with an in-built digital camera (photographing apparatus) such as a smart phone or a tablet computer, or a video camera that is capable of taking a still image (picture).

INDUSTRIAL APPLICABILITY

It is desirable for the photographing apparatus and the photographing control method according to the present invention to be used in a photographing apparatus, and photographing control method therefor, such as a digital camera, etc.

10 Digital SLR camera (Photographing apparatus)
20 Camera body
30 Interchangeable photographing lens
32 Photographing lens group (movable member/shake-correction member)
34 Lens CPU
40 Movable mirror (quick-return mirror/second movable member)
40X Rotational pivot
41 Pentaprism (finder optical system)
42 Eyepiece lens element (finder optical system)
43 Mirror driver
45 Shutter
46 Shutter driver
50 Image sensor (movable member/shake-correction member)
50a Pixels
R G B Color filters
51 Image-sensor drive controller
60 LCD
65 Image memory
70 Image-shake correction device (drive mechanism)
71 Mount support plate
72 Movable stage
73 Shake-correction drive controller (drive-signal generator)
M1 M2 M3 Magnets
Y1 Y2 Y3 Yokes
C1 C2 C3 Drive coils
H1 H2 H3 Hall sensors
80 Operational switches
82 LPF operation switch
85 Shutter-release button (exposure-commencement instructing device/consecutive-shooting commencement instructing device)

100 Camera CPU
110 Photographing mode setter
120 Exposure-commencement controller (consecutive-shooting commencement controller)
130 Image-quality priority consecutive-shooting controller
140 Frame-speed priority consecutive-shooting controller

The invention claimed is:

1. A photographing apparatus comprising:
an image sensor configured to convert an object image that is formed by a photographing optical system into electrical pixel signals;
a driver configured to obtain an optical low-pass filter effect via an object light-bundle being incident on a plurality of pixels of said image sensor by moving a movable member in a direction that is different from an optical axis of said photographing optical system, wherein said movable member includes at least one of a lens element, constituting part of said photographing optical system, and said image sensor;
an exposure-commencement instructing device configured to provide an instruction to commence an exposure of said image sensor; and
an exposure-commencement controller configured to commence a driving of said movable member via said driver upon said image sensor being instructed to commence an exposure by said exposure-commencement instructing device in a non-driving state of said movable member, and after a predetermined unstable-operation period of time of the low-pass filter operation lapses from the commencement of said driving of said movable member, said exposure-commencement controller commences an exposure of said image sensor.

2. The photographing apparatus according to claim 1, further comprising a second movable member configured to perform a photographing preliminary operation in said photographing apparatus upon said image sensor being instructed to commence an exposure by said exposure-commencement instructing device,
wherein said exposure-commencement controller commences a driving of said movable member via said driver while commencing said photographing preliminary operation by said second movable member, upon said image sensor being instructed to commence an exposure by said exposure-commencement instructing device in a non-driving state of said movable member, and after a predetermined unstable-operation period of time of the low-pass filter operation lapses from the commencement of said driving of said movable member, said exposure-commencement controller commences an exposure of said image sensor.

3. The photographing apparatus according to claim 2, wherein said exposure-commencement controller concurrently commences said photographing preliminary operation via said second movable member and said driving of said movable member via said driver.

4. The photographing apparatus according to claim 2, wherein said exposure-commencement controller is configured to commence said photographing preliminary operation via said second movable member and to commence a driving of said movable member via said driver at a displaced timing.

5. The photographing apparatus according to claim 2, wherein said second movable member comprises a quick-return mirror configured to rotate between a mirror-down position and a mirror-up position, and
wherein said exposure-commencement controller commences a driving of said movable member via said driver while commencing a rotation of said quick-return mirror from said mirror-down position to said mirror-up position, when said quick-return mirror is at said mirror-down position and upon said image sensor being instructed to commence an exposure by said exposure-commencement instructing device in a non-driving state of said movable member, and after a predetermined unstable-operation period of time of the low-pass filter operation lapses from the commencement of said driving of said movable member, said exposure-commencement controller commences an exposure of said image sensor.

6. The photographing apparatus according to claim 5, wherein said exposure-commencement controller concurrently commences the rotation of said quick-return mirror from said mirror-down position to said mirror-up position and commences said driving of said movable member via said driver.

7. The photographing apparatus according to claim 5, wherein said exposure-commencement controller commences the rotation of said quick-return mirror from said mirror-down position to said mirror-up position and commences said driving of said movable member via said driver at a displaced timing.

8. The photographing apparatus according to claim 5, wherein said predetermined unstable-operation period of time of the low-pass filter operation is included in a time required to rotate said quick-return mirror from said mirror-down position to said mirror-up position.

9. A photographing control method of a photographing apparatus, which includes an image sensor, which converts an object image that is formed by a photographing optical system into electrical pixel signals; and a driver configured to obtain an optical low-pass filter effect via an object light-bundle being incident on a plurality of pixels of said image sensor by moving a movable member in a direction that is different from an optical axis of said photographing optical system, wherein said movable member includes at least one of a lens element, constituting part of said photographing optical system, and said image sensor, said photographing control method comprising:
instructing said image sensor to commence an exposure; and
controlling a commencement of a driving of said movable member by said driver upon said image sensor being instructed to commence an exposure in a non-driving state of said movable member, and after a predetermined unstable-operation period of time of the low-pass filter operation lapses from the commencement of said driving of said movable member, controlling a commencement of an exposure of said image sensor.

10. The photographing control method of a photographing apparatus according to claim 9,
wherein said photographing apparatus further comprises a second movable member configured to perform a photographing preliminary operation in said photographing apparatus upon said image sensor being instructed to commence an exposure,
wherein a driving of said movable member is commenced via said driver while said photographing preliminary operation by said second movable member is commenced, upon said image sensor being instructed to commence an exposure in a non-driving state of said movable member, and after a predetermined unstable-operation period of time of the low-pass filter operation lapses from the commencement of said driving of said movable member, an exposure of said image sensor is commenced.

11. The photographing control method of a photographing apparatus according to claim 10, wherein, said photographing preliminary operation via said second movable member and said driving of said movable member via said driver are concurrently commenced.

12. The photographing control method of a photographing apparatus according to claim 10, wherein, said photographing preliminary operation via said second movable member and said driving of said movable member via said driver are commenced at a displaced timing.

13. The photographing control method of a photographing apparatus according to claim 10, wherein said second movable member comprises a quick-return mirror configured to rotate between a mirror-down position and a mirror-up position, and wherein a driving of said movable member is commenced via said driver while commencing a rotation of said quick-return mirror from said mirror-down position to said mirror-up position, when said quick-return mirror is at said mirror-down position and upon said image sensor being instructed to commence an exposure in a non-driving state of said movable member, and after a predetermined unstable-operation period of time of the low-pass filter operation lapses from the commencement of said driving of said movable member, commences an exposure of said image sensor.

14. The photographing control method of a photographing apparatus according to claim 13, wherein the rotation of said quick-return mirror from said mirror-down position to said mirror-up position and said driving of said movable member via said driver are concurrently commenced.

15. The photographing control method of a photographing apparatus according to claim 13, wherein the rotation of said quick-return mirror from said mirror-down position to said mirror-up position and said driving of said movable member via said driver are commenced at a displaced timing.

16. The photographing control method of a photographing apparatus according to claim 13, wherein said predetermined unstable-operation period of time of the low-pass filter operation is included in a time required to rotate said quick-return mirror from said mirror-down position to said mirror-up position.

* * * * *